US011924094B2

(12) United States Patent
Wang et al.

(10) Patent No.: US 11,924,094 B2
(45) Date of Patent: Mar. 5, 2024

(54) VIRTUAL CIRCUIT-BASED DATA PACKET PROCESSING METHOD AND FORWARDING TABLE ENTRY CONSTRUCTION METHOD

(71) Applicant: ZTE Corporation, Shenzhen (CN)

(72) Inventors: Yubao Wang, Shenzhen (CN); Bing Song, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/790,251

(22) PCT Filed: Nov. 3, 2020

(86) PCT No.: PCT/CN2020/126168
§ 371 (c)(1),
(2) Date: Jun. 30, 2022

(87) PCT Pub. No.: WO2021/135624
PCT Pub. Date: Jul. 8, 2021

(65) Prior Publication Data

US 2023/0031179 A1 Feb. 2, 2023

(30) Foreign Application Priority Data

Dec. 31, 2019 (CN) ........................ 201911419401.X

(51) Int. Cl.
*H04L 12/46* (2006.01)
*H04L 12/24* (2006.01)
(Continued)

(52) U.S. Cl.
CPC ........ *H04L 45/566* (2013.01); *H04L 12/4641* (2013.01); *H04L 41/0895* (2022.05);
(Continued)

(58) Field of Classification Search
CPC . H04L 12/4641; H04L 41/08; H04L 41/0895; H04L 45/02; H04L 45/10;
(Continued)

(56) References Cited

U.S. PATENT DOCUMENTS 9,178,717 B1 11/2015 Ruble et al.
10,764,249 B1 * 9/2020 Kommula ........... H04L 63/0272
(Continued)

FOREIGN PATENT DOCUMENTS

CN 1744541 A 3/2006
CN 101350760 A 1/2009
(Continued)

OTHER PUBLICATIONS

International Search Report for corresponding application PCT/CN2020/126168 filed Nov. 3, 2020; dated Jan. 26, 2021.
(Continued)

*Primary Examiner* — Boris D Grijalva Lobos
(74) *Attorney, Agent, or Firm* — CANTOR COLBURN LLP

(57) ABSTRACT

Provided is a virtual circuit-based data packet processing method, which includes that: identification information of a next-hop Provider Edge (PE) node of a routing packet and identification information of an Original PE (OPE) node of the routing packet are determined according to the routing packet corresponding to a Virtual Private Network (VPN) service instance; a context virtual circuit is determined, wherein nodes at both ends of the context virtual circuit are respectively the current PE node and the OPE node; a virtual circuit label of the context virtual circuit is determined; a final data packet to be forwarded is obtained by carrying a VPN label of the routing packet and the virtual circuit label
(Continued)

with an initial data packet of the VPN service instance; and the final data packet to be forwarded is forwarded to the next-hop PE node.

20 Claims, 5 Drawing Sheets

(51) Int. Cl.

| | |
|---|---|
| ***H04L 12/721*** | (2013.01) |
| ***H04L 12/723*** | (2013.01) |
| ***H04L 41/0895*** | (2022.01) |
| ***H04L 45/00*** | (2022.01) |
| ***H04L 45/02*** | (2022.01) |
| ***H04L 45/44*** | (2022.01) |
| ***H04L 45/50*** | (2022.01) |

(52) U.S. Cl.
CPC .............. *H04L 45/10* (2013.01); *H04L 45/44* (2013.01); *H04L 45/50* (2013.01); *H04L 45/507* (2013.01); *H04L 45/54* (2013.01); *H04L 45/56* (2013.01)

(58) Field of Classification Search
CPC ....... H04L 45/44; H04L 45/50; H04L 45/507; H04L 45/54; H04L 45/56
See application file for complete search history.

(56) References Cited

U.S. PATENT DOCUMENTS

| | | | | |
|---|---|---|---|---|
| 2006/0168279 | A1 | 7/2006 | Lee | |
| 2008/0170493 | A1* | 7/2008 | Vasseur | H04L 45/22 370/389 |
| 2009/0323698 | A1 | 12/2009 | Le Faucheur et al. | |
| 2020/0169502 | A1* | 5/2020 | Li | H04L 45/68 |
| 2023/0031179 | A1* | 2/2023 | Wang | H04L 12/4604 |

FOREIGN PATENT DOCUMENTS

| | | | | |
|---|---|---|---|---|
| CN | 101433030 | A | 5/2009 | |
| CN | 101771561 | A | 7/2010 | |
| CN | 102368726 | A | 3/2012 | |
| CN | 103475581 | A | 12/2013 | |
| CN | 105450520 | A | 3/2016 | |
| CN | 105991433 | A | 10/2016 | |
| CN | 110417655 | A | 11/2019 | |
| EP | 1227623 | A2 | 7/2002 | |
| WO | 2008040163 | A1 | 4/2008 | |
| WO | WO-2012006162 | A1 * | 1/2012 | H04L 67/025 |
| WO | 2019119220 | A1 | 6/2019 | |
| WO | 2019205836 | A1 | 10/2019 | |

OTHER PUBLICATIONS

European Search Report for corresponding application EP 91 0954; dated Apr. 5, 2023.
Zhang E. Rosen, “MVPN/EVPN Tunnel Aggregation with Common Labels”, Feb. 1, 2018, pp. 1-12, XP015125656.

* cited by examiner

Fig. 1

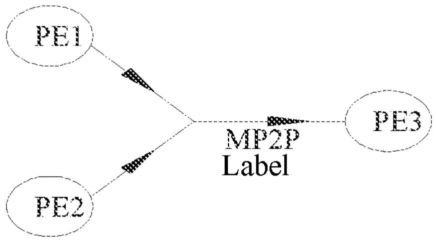

Fig. 2

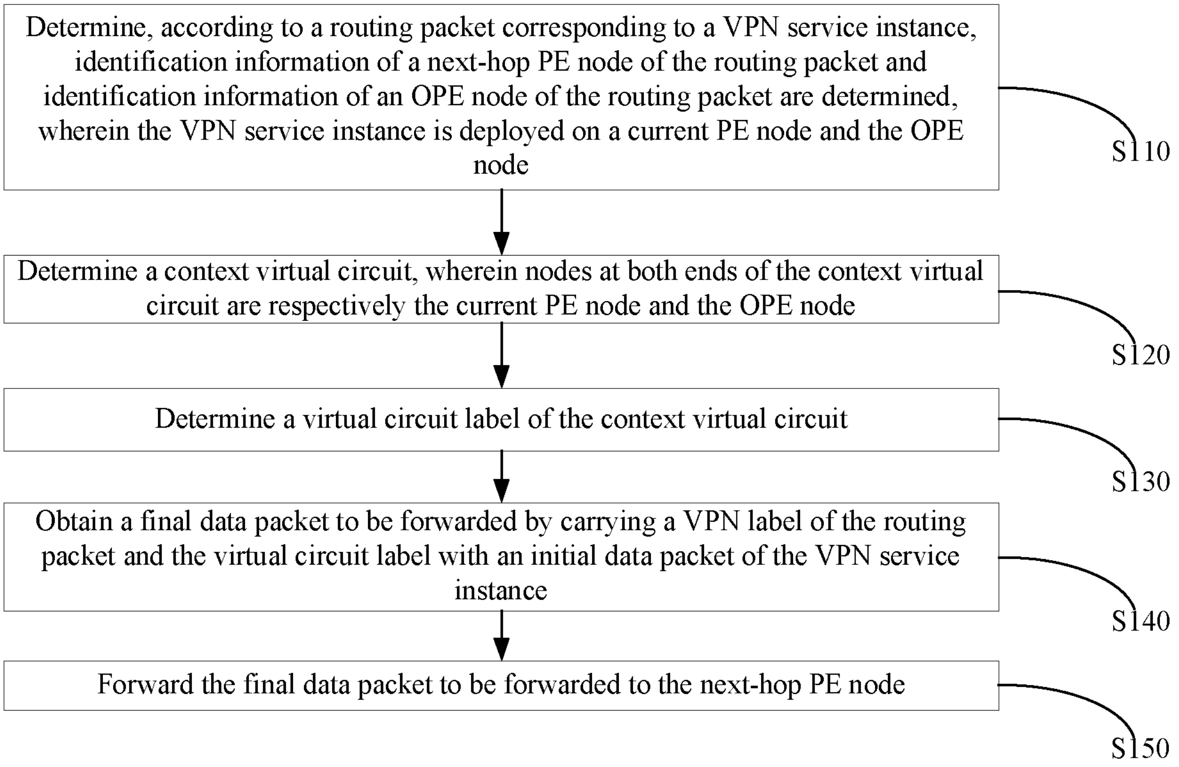

Fig. 3

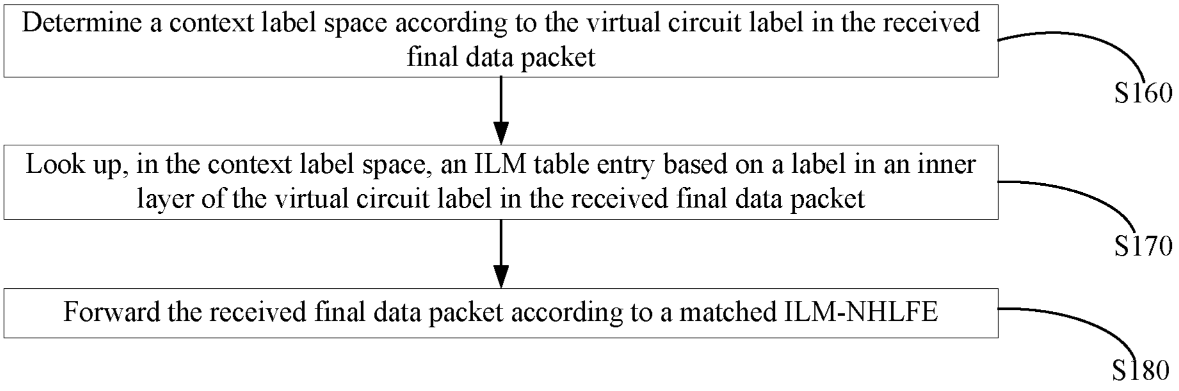

| Determine, according to a routing packet corresponding to a VPN service instance, identification information of a next-hop PE node of the routing packet and identification information of an OPE node of the routing packet are determined, wherein the VPN service instance is deployed on a current PE node and the OPE node | S110 |

↓

| Determine a context virtual circuit, wherein nodes at both ends of the context virtual circuit are respectively the current PE node and the OPE node | S120 |

↓

| Determine a virtual circuit label of the context virtual circuit | S130 |

↓

| Obtain a final data packet to be forwarded by carrying a VPN label of the routing packet and the virtual circuit label with an initial data packet of the VPN service instance | S140 |

↓

| Forward the final data packet to be forwarded to the next-hop PE node | S150 |

| Determine a context label space according to the virtual circuit label in the received final data packet | S160 |

↓

| Look up, in the context label space, an ILM table entry based on a label in an inner layer of the virtual circuit label in the received final data packet | S170 |

↓

| Forward the received final data packet according to a matched ILM-NHLFE | S180 |

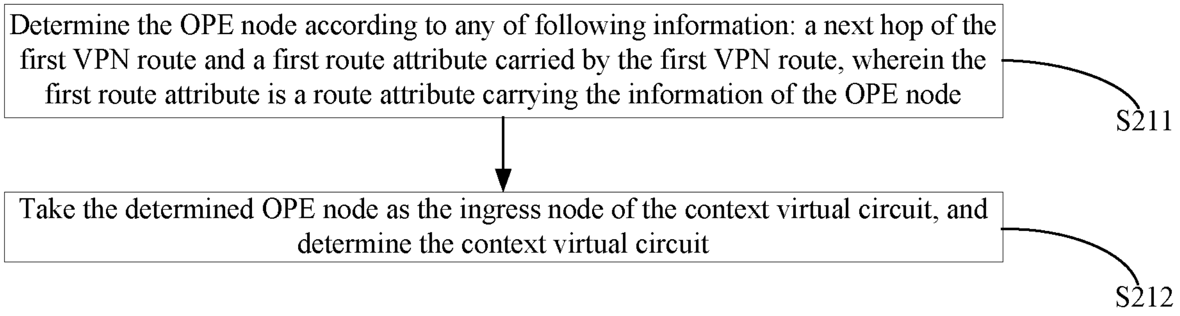

Fig. 6

| Determine the OPE node according to any of following information: a next hop of the first VPN route and a first route attribute carried by the first VPN route, wherein the first route attribute is a route attribute carrying the information of the OPE node |
|---|

S211

↓

| Take the determined OPE node as the ingress node of the context virtual circuit, and determine the context virtual circuit |
|---|

S212

VIRTUAL CIRCUIT-BASED DATA PACKET PROCESSING METHOD AND FORWARDING TABLE ENTRY CONSTRUCTION METHOD

CROSS-REFERENCE TO RELATED APPLICATION

The present disclosure is a National Stage Filing of PCT International Application No. PCT/CN2020/126168 filed on Nov. 3, 2020, which is based upon and claims priority to Chinese patent application No. 201911419401.X, filed on Dec. 31, 2019, the disclosure of which is hereby incorporated by reference in its entirety.

TECHNICAL FIELD

The present disclosure relates to the technical field of communications, and in particular to a virtual circuit-based data packet processing method, a virtual circuit-based context label forwarding table entry construction method, a Provider Edge (PE), and a computer-readable storage medium.

BACKGROUND

In Virtual Private Network (VPN) technologies based on Multi-Protocol Label Switching (MPLS), such as the Layer 2 Virtual Private Network (L2VPN), the Layer 3 Virtual Private Network (L3VPN) and the Ethernet Virtual Private Network (EVPN), the Label Distribution Protocol (LDP), the Border Gateway Protocol-LU (BGP-LU), the Segment Routing-Multi-Protocol Label Switching (SR-MPLS) and other protocols are common outer MPLS tunnel establishing technologies. Tunnels established by these protocols have a common characteristic, that is, they are Multi Peer to Peer (MP2P) tunnels, and use an MP2P label. As shown in FIG. 1, packets entering the MP2P tunnel from any ingress node have the same MP2P label when reaching an egress node of the MP2P tunnel.

However, on a forwarding plane, when a data packet is received from the MP2P label, it is impossible to know from the MP2P label which ingress node the packet is forwarded from. For example, a PE3 node in FIG. 1 does not know whether the data packet is sent from a PE1 node or a PE2 node.

In addition, there is a problem in the related art that in a data packet forwarding process, different data packets with the same VPN label sent from the same ingress TPE to different egress TPEs cannot be processed differently on the same Switching PE (SPE) node. The SPE node lacks context information to distinguish the data packets with the same VPN label sent to different egress Terminal PE (TPE) nodes.

To sum up, there is still a problem in the related art that the context of packets cannot be identified.

SUMMARY

As a first aspect of the embodiments of the present disclosure, a virtual circuit-based data packet processing method is provided, which is applied to a PE node, and may include the following operations. Identification information of a next-hop PE node of the routing packet and identification information of an Original PE (OPE) node of the routing packet are determined according to a routing packet corresponding to a VPN service instance which is deployed on a current PE node and the OPE node. A context virtual circuit is determined, wherein nodes at both ends of the context virtual circuit are respectively the current PE node and the OPE node. A virtual circuit label of the context virtual circuit is determined. A final data packet to be forwarded is obtained by carrying a VPN label of the routing packet and the virtual circuit label with an initial data packet of the VPN service instance. The final data packet to be forwarded is forwarded to the next-hop PE node.

As a second aspect of the embodiments of the present disclosure, a virtual circuit-based forwarding table entry construction method is provided, which is applied to the PE node, and may include the following operations. A context virtual circuit corresponding to a first VPN label of a first VPN route is determined according to the first VPN route received, wherein nodes at both ends of the context virtual circuit are respectively the current PE node and the OPE node generating the VPN route, and the first VPN route being the VPN route corresponding to a VPN service instance. A virtual circuit label of the context virtual circuit is determined. A label space is bound to the virtual circuit label so that the context virtual circuit identifies a context label space to which the first VPN label belongs. A value of the first VPN label is determined for the first VPN route in the label space. A context label forwarding table entry, which is a label forwarding table entry in the context label space, is constructed for the first VPN label.

As a third aspect of the embodiments of the present disclosure, a computer-readable storage medium is provided, in which an executable program is stored. When called, the executable program can implement any of the following methods: the processing method provided in the first aspect of the embodiments of the present disclosure; and the construction method provided in the second aspect of the embodiments of the present disclosure.

As a fourth aspect of the embodiments of the present disclosure, a PE is provided, which may include: a storage module, in which an executable program is stored; and one or more processors, which implement any of the following methods when calling the executable program: the processing method provided in the first aspect of the embodiments of the present disclosure; and the construction method provided in the second aspect of the embodiments of the present disclosure.

In the data packet processing method provided in the first aspect of the embodiments of the present disclosure, information of the ingress node of the VPN service may be carried in the final data packet by means of the virtual circuit label. The virtual circuit label can be obtained by parsing the final data packet, and then the information of the current PE node and the OPE node can be obtained, so as to determine the PE node sending the final data packet.

In the construction method provided in the second aspect of the embodiments of the present disclosure, the information of the OPE node generating the VPN route is encapsulated in the context label forwarding table entry, and other PE nodes in the VPN service may be notified of which node the data packet needs to be sent to.

To sum up, the data packet processing method and the context label forwarding table entry construction method provided by the present disclosure can solve the problem in the related art that the context of packets cannot be identified.

BRIEF DESCRIPTION OF THE DRAWINGS

The accompanying drawings are used for providing further understanding of the present disclosure, and constitute a part of the specification. The accompanying drawings are used for illustrating the present disclosure together with the following exemplary embodiments, and not intended to form a limit to the present disclosure. In the accompanying drawings:

FIG. 1 is a schematic diagram of data forwarding based on an MP2P label in the related art;

FIG. 2 is a flowchart of a data packet processing method provided by an embodiment of the present disclosure;

FIG. 3 is a flowchart after a current PE node receives a data packet with a first predetermined format;

FIG. 6 is a flowchart of determining a context virtual circuit provided by an embodiment of the present disclosure;

DETAILED DESCRIPTION

Figure 4:
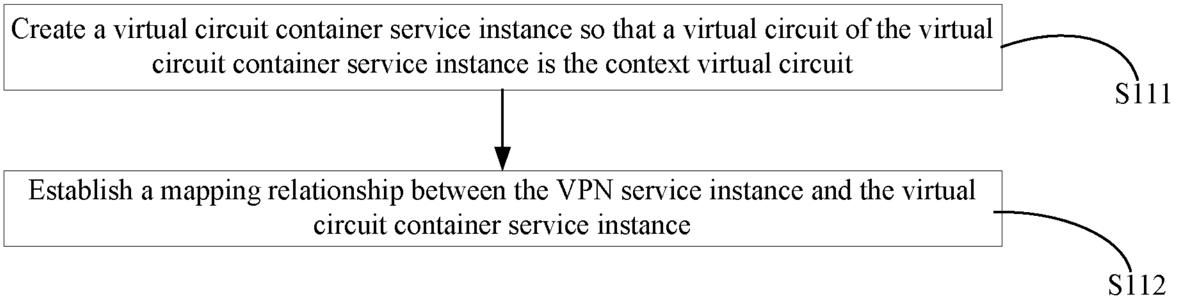
FIG. 4 is a flowchart of obtaining a context virtual circuit through a virtual circuit container service instance when processing a data packet.

The exemplary embodiments of the present disclosure are elaborated below in combination with the accompanying drawings. It should be understood that the exemplary embodiments described herein are used only to illustrate and explain the present disclosure and are not used to limit the present disclosure.

Various exemplary embodiments of the present disclosure include a common part, that is, creating a virtual circuit container service among all PE nodes in a network, and creating a virtual circuit VC between each two PE nodes through the virtual circuit container service. For ease of description, in the embodiments of the present disclosure, an IP address for identifying a $PE_i$ node is called $IP_i$, a virtual circuit from $PE_i$ to $PE_j$ is called $VC_{ij}$, a virtual circuit label corresponding to the $VC_{ij}$ is called $L_{ij}$, an MP2P tunnel label from $PE_i$ to $PE_j$ is called $L_j$, and the whole process from the creation of a virtual circuit container service to the successful establishment of all expected virtual circuits is called constructing a virtual circuit infrastructure for the network. In the embodiments, a management plane, a control plane and a signaling plane of the virtual circuit container service often reuse the control plane of an existing protocol, however, unless otherwise specified, the virtual circuit container services in various exemplary embodiments of the present disclosure do not use a data plane of the reused protocols by default.

It should be pointed out that, in the embodiments of the present disclosure, a number of PEs may form a protection group, the protection group is identified by an IP address, and the IP address is called a protection group IP. Taking the protection group consisting of $PE_i$ and $PE_j$ as an example, its protection group IP is denoted as $IP_{ij}$, which is both the IP address of $PE_i$ and the IP address of $PE_j$, and is used as both a destination address of a tunnel to $PE_i$ and a destination address of a tunnel to $PE_j$. In fact, the $IP_{ij}$ can be shared between $PE_i$ and $PE_j$, so a tunnel taking the $IP_{ij}$ as the destination address is called Anycast tunnel of the protection group.

It should be pointed out that, in the embodiments of the present disclosure, "binding a label space X to a label L" is not the same as "a label L is in a label space X", the former means that the label space X may be found through the label L, but the label L is not in X, and the latter means that the label L is in X, and an Incoming Label Mapping (ILM) table of the label L cannot be found if X is not known in advance.

As a first aspect of the embodiments of the present disclosure, a virtual circuit-based data packet processing method is provided, which is applied to a PE node. As shown in FIG. 2, the data packet processing method may include the following operations.

At S110, identification information of a next-hop PE node of the routing packet and identification information of an OPE node of the routing packet are determined according to a routing packet corresponding to a VPN service instance, the VPN service instance being deployed on a current PE node and the OPE node.

At S120, a context virtual circuit is determined, wherein nodes at both ends of the context virtual circuit are respectively the current PE node and the OPE node.

At S130, a virtual circuit label of the context virtual circuit is determined.

At S140, a final data packet to be forwarded is obtained by carrying a VPN label of the routing packet and the virtual circuit label with an initial data packet of the VPN service instance.

At S150, the final data packet to be forwarded is forwarded to the next-hop PE node. The next-hop PE node may be the same as the OPE node.

The data packet processing method provided by the present disclosure includes that: the initial data packet of a target VPN service instance is processed, the VPN label and the virtual circuit label including the identification information of the current PE node and the identification information of the OPE node are encapsulated in the initial data packet to obtain the final data packet, and after receiving the final data packet corresponding to the VPN route, the PE node parses the final data packet and can obtain information of two endpoints of the context virtual circuit (i.e., context information).

That is, in the data packet processing method provided by the present disclosure, information of an ingress node of the VPN service may be carried in the final data packet by means of the virtual circuit label. The virtual circuit label can be obtained by parsing the final data packet, and then the information of the current PE node and the OPE node can be obtained, so as to determine the PE node sending the final data packet.

In the embodiments of the present disclosure, the information of the ingress node of the context virtual circuit is the information of the PE node sending the final data packet or the information of an egress PE node that terminates MPLS encapsulation of the final data packet.

It should be pointed out that the context virtual circuit does not identify any service, but only identifies an ingress PE node or egress PE node of the final data packet.

In the embodiments of the present disclosure, there is no special restriction on the identification information of the current PE node, as long as the current PE node can be uniquely identified. As an exemplary embodiment, the identification information of the current PE node includes the IP address of the current PE node or the ID of the current PE node.

Taking that the current PE node is a first PE node, and the OPE node is a second PE node as an example, the data packet processing method provided by the present disclosure is described below.

First, the data packet processing method is executed by the first PE node. For ease of description, the VPN service instance is called VPN service instance 1, and the routing packet corresponding to the VPN service instance 1 is called routing packet R1.

At S110, the first PE node determines the OPE node as the second PE node according to routing packet R1, and determines the identification information of the second PE node (the identification information may be the ID of the second PE node).

At S120, the context virtual circuit is determined, wherein nodes at both ends of the context virtual circuit are respectively the first PE node and the second PE node.

At S130, the first PE node determines the virtual circuit label of the context virtual circuit between the first PE node and the second PE node according to the routing packet R1, the identification information of the first PE node, and the identification information of the second PE node.

At S140, the first PE node obtains the final data packet by carrying the virtual circuit label and the VPN label of the VPN routing packet with the initial data packet.

At S150, after the final data packet is obtained, the final data packet is forwarded to the next-hop PE node according to routing information in routing packet R1. The next-hop PE node may or may not be the second PE node. When the next-hop PE node is not the second PE node, the final data packet may be forwarded to the second PE node through at least one next hop.

After receiving the final data packet, the second PE node may obtain the virtual circuit label by parsing the data packet, and may determine the information of the ingress PE node (namely the information of the first PE node) of the context virtual circuit according to the virtual circuit label.

In the embodiments of the present disclosure, there is no special restriction on how to determine the OPE node.

In an embodiment, the next hop of the routing packet may be used as the OPE node.

As another embodiment, the OPE node may be determined according to a first route attribute which carries information of the OPE node.

In the embodiments of the present disclosure, there is no special restriction on the first route attribute, and the specific type of the first route attribute is related to the type of the VPN service instance. For example, when the VPN service instance is an EVPN service, the first route attribute may be either a Nexthop attribute or an OPE TLV attribute.

The value of the first route attribute may be the identity of the OPE node (for example, the ID of a PE node), that is, the value of the first route attribute is the identification information of an endpoint of the context virtual circuit (i.e., the ingress PE node or egress PE node of the context virtual circuit).

Of course, the present disclosure is not limited to this, it is also possible to extend a new BGP attribute to carry the attributes of the OPE node in the context virtual circuit.

It should be pointed out that the PE nodes in the VPN service are classified into SPE nodes and TPE nodes. In the VPN service, the PE node that further forwards the VPN route issued by one PE node to another PE node is the SPE node. When forwarding the VPN route to another PE node, the SPE node modifies the Nexthop attribute of the VPN route to a node IP address of the SPE node itself. The PE node that generates and issues the VPN route is the TPE node. The TPE node may also carry the OPE TLV attribute in the VPN route issued by it. The OPE TLV attribute and the Nexthop attribute both identify the node IP address of the TPE node.

The VPN route may be processed by zero or more SPE nodes before reaching the remote TPE node. The value of the Nexthop attribute may have been modified, but the value of the OPE TLV attribute remains unchanged. For the PE nodes (including the SPE node and the TPE node) that receive the VPN route, the Nexthop attribute may be used to determine an outer tunnel, and the OPE TLV attribute may be used to determine the virtual circuit.

It is to be noted that when the SPE node uses an Anycast SR tunnel, the Nexthop attribute in an RT-2 route (which is a type-2 EVPN route, also called MAC/IP advertisement route) it forwards is the address of the Anycast SR tunnel, and the address is the same on the different SPE nodes that protect each other.

It is to be noted that by default, the attributes of the virtual circuit may be determined by priority: the first route attribute is superior to the Nexthop attribute.

As described above, the nodes at both ends of the context virtual circuit are respectively the current PE node and the OPE node, which means that one of the current PE node and the OPE node is used as the ingress node of the context virtual circuit and the other is used as the egress node of the context virtual circuit.

In the embodiments of the present disclosure, there is no special restriction on which of the current PE node and the OPE node is the ingress node of the context virtual circuit and which is the egress node of the context virtual circuit. However, the format of the final data packet is different in the case that the current PE node is used as the ingress node of the context virtual circuit and in the case that the OPE node is used as the ingress node of the context virtual circuit. If the format of the obtained final data packet to be forwarded is different, the PE node that receives the final data packet to be forwarded processes the final data packet differently.

The ingress node of the context virtual circuit is the OPE node, the egress node of the context virtual circuit is the current PE node, and the final data packet has a first predetermined format. The first predetermined format is that the virtual circuit label is in an outer layer of the VPN label.

In the current VPN service, the current PE node is used as the PE node that generates and forwards the final data packet to be processed. However, in other VPN services, the current PE node may receive the virtual circuit label that encapsulates the context virtual circuit sent by another PE node. In this case (that is, the final data packet with the first predetermined format sent by another PE node in the network is received), as shown in FIG. 3, the data packet processing method may also include the following operations.

At S160, a context label space is determined according to the virtual circuit label in the received final data packet.

At S170, an ILM table entry is looked up, in the context label space, based on a label in an inner layer of the virtual circuit label in the received final data packet.

At S180, the received final data packet is forwarded according to a matched Incoming Label Mapping-Next Hop Label Forwarding Entry (ILM-NHLFE).

That is, through S160 to S170, the context virtual circuit including the corresponding VPN service may be forwarded to the next hop until the context virtual circuit is forwarded to the egress PE node of the VPN service.

As another embodiment, an egress node of the context virtual circuit is the OPE node, an ingress node of the context virtual circuit is the current PE node, and the final data packet has a second predetermined format. The second predetermined format is that the virtual circuit label is in an inner layer of the VPN label.

Optionally, before S120 in which the context virtual circuit is determined, as shown in FIG. 4, the data packet processing method may also include S111 and S112. At S111, a virtual circuit container service instance is created so that a virtual circuit of the virtual circuit container service instance is the context virtual circuit. At S112, a mapping relationship between the VPN service instance and the virtual circuit container service instance is established.

When multiple virtual circuit container service instances are created on the current PE node, one virtual circuit container service instance may be assigned to each VPN service instance. However, when only one virtual circuit container service instance is created on the current PE node, all VPN service instances carried by the current PE node correspond to the virtual circuit container service instance.

In the embodiments of the present disclosure, there is no special restriction on the specific form of the virtual circuit container service instance. Optionally, the virtual circuit container service instance satisfies a following condition:

the control plane of the virtual circuit container service instance includes a routing protocol serving as an SR-MPLS control plane, so that a routing protocol instance of the SR-MPLS control plane may also be used as the virtual circuit container service instance; or the virtual circuit container service instance is an L2VPN control plane that is able to create a Pseudo Wire (PW).

In a case where the virtual circuit container service instance is used as the routing protocol instance of the SR-MPLS control plane, a value of the virtual circuit label is a value of a label, which corresponds to a Segment Identifier (SID) of the one of the current PE node and the OPE node that is used as the ingress node of the context virtual circuit, in a Segment Routing Global Block (SRGB) of the one of the current PE node and the OPE node that is not used as the ingress node of the context virtual circuit.

Specifically, when the virtual circuit container service instance serves as the routing protocol instance of the SR-MPLS control plane, the value of the context virtual circuit label has two cases. One case is that if the current PE node is the ingress node of the context virtual circuit, the value of the virtual circuit label of the context virtual circuit is the value of the label corresponding to the SID of the current PE node in the SRGB of the OPE node. The other case is that if the OPE node is the ingress node of the context virtual circuit, the value of the virtual circuit label of the context virtual circuit is the value of the label corresponding to the SID of the OPE node in the SRGB of the current PE node.

Optionally, when the routing protocol instance of the SR-MPLS control plane creates an SR-MPLS tunnel through the same SRGB, the data packet processing method may also include that: an ILM table entry corresponding to the context virtual circuit with the current PE node as the egress node is determined as the table entry in the context label space; and the ILM table entry corresponding to SR-MPLS tunnel is bound to the context label space.

It should be pointed out that only the ILM table entry whose SR-MPLS tunnel label operation is pop needs to be bound to the context label space.

The L2VPN instance that is able to create the PW includes a Martini mode L2VPN instance, a Kompella mode L2VPN instance, an L2VPN BGP automatic discovery instance, an EVPN instance of a migration Kompella Virtual Private LAN Service (VPLS) control plane, etc.

As an exemplary embodiment, the virtual circuit label is a label in the context label space, and the outer label of the virtual circuit label identifies the context label space. The outer label is one of the following: an MP2P tunnel label to the next-hop PE node; a Special Purpose Label (SPL); an extended SPL; a static label configured on the next-hop PE node; or the VPN label.

It is to be noted that after the forwarding equivalence class of the outer label is mapped to the context label space, the outer label can identify the context label space.

When the virtual circuit label is within the VPN label, the outer label should also be within the VPN label (or the outer label is the VPN label).

In the embodiments of the present disclosure, there is no special restriction on the format of the routing packet corresponding to the VPN service instance. The routing packet corresponding to the VPN service instance is the VPN routing packet matching a unicast data packet, or the routing packet matches a Broadcast&Unkown-unicast&Multicast (BUM) data packet, and the routing packet is in an ingress replication mode.

Optionally, the VPN service instance is a BGP automatic discovery L2VPN instance, and the routing packet is an automatic discovery routing packet issued by the BGP on the OPE node of the VPN service instance for the L2VPN instance.

The above describes only the operation performed by the current PE node when receiving the final data packet with the first predetermined format.

When the current PE node receives the final data packet with the second predetermined format, the data packet processing method may include that: in response to a final data packet sent by another PE node in the network, the identification information of the ingress node of the context virtual circuit corresponding to the received final data packet is determined according to the virtual circuit label in the received final data packet. The identification information being used for at least one of the following: recording the determined identification information of the ingress node as the identification information of the ingress PE node of the received final data packet; when the current PE node is about to forward the received final data packet to the ingress node of the context virtual circuit, discarding the final data packet; and when the current PE node is about to forward the received final data packet to any remote PE node in a split horizon group to which the ingress node of the context virtual circuit belongs, discarding the final data packet.

Optionally, in the operation of recording the determined identification information of the ingress node as the identification information of the ingress PE node of the received final data packet, the identification information of the determined ingress node is recorded in at least one of an MAC table entry, alarm information, log information, and performance statistics for an inner layer load.

Optionally, the VPN service instance is one of L2VPN service, L3VPN service, or EVPN service.

Figure 5:
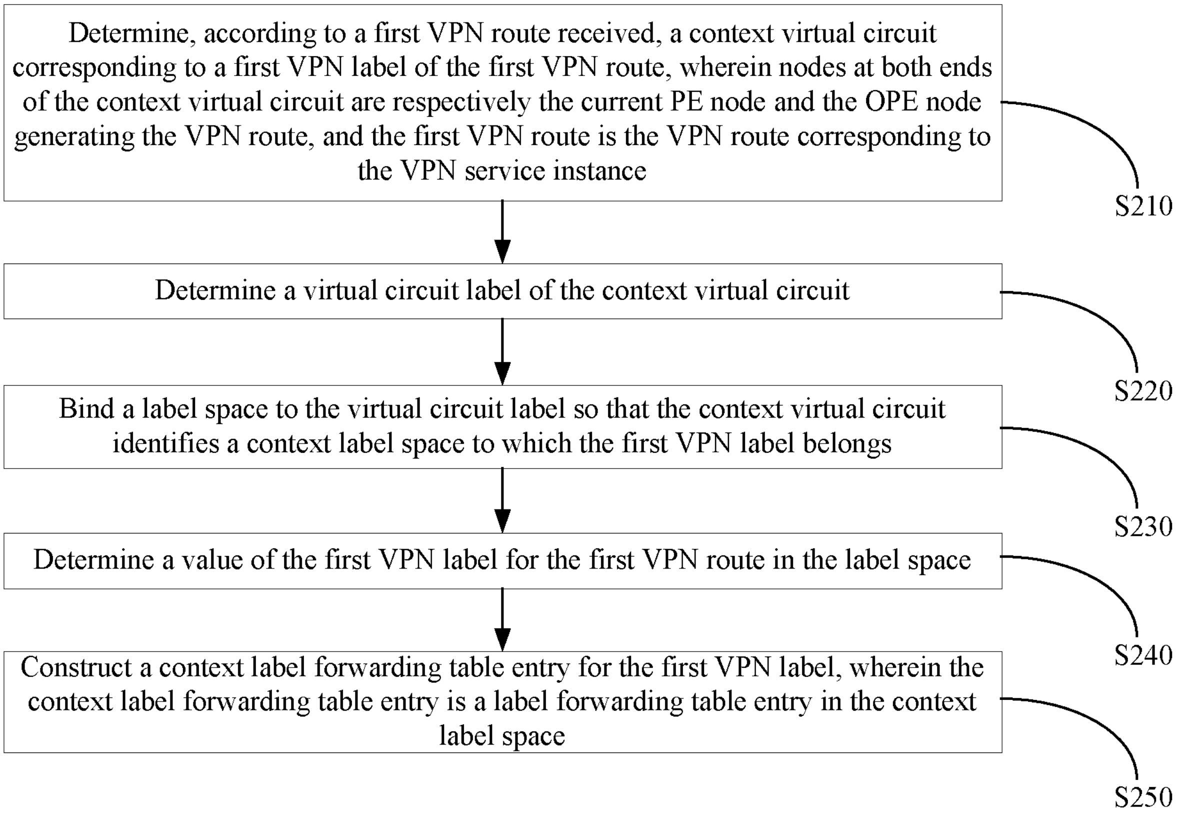
FIG. 5 is a flowchart of a context label forwarding table entry construction method provided by an embodiment of the present disclosure.

As a second aspect of the embodiments of the present disclosure, a virtual circuit-based forwarding table entry construction method is provided, which is applied to a PE node. As shown in FIG. 5, the construction method may include the following operations.

At S210, a context virtual circuit corresponding to a first VPN label of a first VPN route is determined according to the first VPN route received, wherein nodes at both ends of the context virtual circuit are respectively the current PE node and the OPE node generating the VPN route. The first VPN route is the VPN route corresponding to the VPN service instance.

At S220, a virtual circuit label of the context virtual circuit is determined.

At S230, a label space is bound to the virtual circuit label so that the context virtual circuit identifies a context label space to which the first VPN label belongs.

At S240, a value of the first VPN label is determined for the first VPN route in the label space.

At S250, a context label forwarding table entry is constructed for the first VPN label, the context label forwarding table entry being a label forwarding table entry in the context label space.

In the construction method provided by the present disclosure, the context label forwarding table entry is constructed using the first VPN route corresponding to the VPN service instance, and in the subsequent forwarding of the data packet, the virtual circuit label carrying the information of the context virtual circuit may be forwarded in the context label forwarding table entry. When the OPE node of the VPN service is received, it may be determined, through the virtual circuit label in the context label forwarding table entry, which PE node the data packet of the VPN service needs to be sent to.

In the embodiments of the present disclosure, the first VPN route has two specific cases.

The first case is that the first VPN route is a route generated according to the VPN routing packet, correspondingly, the next hop of the first VPN route is the next hop in the routing packet. In this case, the value of the first VPN label is the value of the VPN label of the routing packet, and the PE node generating the VPN route is the OPE node of the routing packet.

The second case is that the first VPN route is the local VPN route of the current PE node, and the next hop of the first VPN route is the current PE node. In this case, the value of the VPN label is assigned by the current PE node, and the OPE node generating the first VPN route is also the current PE node.

It should be pointed out that only the OPE node can generate the VPN route, that is, the OPE node can only be the TPE node rather than the SPE node in the VPN service.

The context virtual circuit determined when the context label forwarding table entry is constructed is the virtual circuit from the egress PE node (i.e. the OPE node) of the routing packet to the current PE node.

The context label forwarding table entry is the ILM table entry of the first VPN label in the label space.

Specifically, when the next hop of the VPN route is not the current PE node, the ILM table entry is associated with an NHLFE table entry. The NHLFE table entry corresponds to the VPN routing packet based on which the first VPN route is generated, and includes the first VPN label. When the next hop of the VPN route is the current PE node, the ILM table entry is associated with the VPN service instance or an interface bound to the VPN service instance and the VPN route.

When the current PE node is the SPE node of a VPN service, the VPN route of the VPN service is used to perform the construction method to obtain the context label forwarding table entry.

When the final data packet corresponding to the VPN service has the first predetermined format mentioned above, the construction method may be used to construct the context label forwarding table entry.

Similar to the data packet processing method provided in the first aspect of the embodiments of the present disclosure, in the construction method, it is necessary to determine the information of the ingress node of the context virtual circuit first, and then determine the context virtual circuit according to the information of the ingress node of the context virtual circuit. That is, as shown in FIG. 6, S210 may include the following operations.

At S211, the OPE node is determined according to any of the following information: the next hop of the first VPN route and the first route attribute carried by the first VPN route. The first route attribute is the route attribute carrying the information of the OPE node.

At S212, the determined OPE node is taken as the ingress node of the context virtual circuit, and the context virtual circuit is determined.

It is to be noted that the current PE node may serve as both the SPE node and the TPE node in the VPN service; in this case, the current PE node also needs to perform the construction method.

When the current PE node is the SPE node, the context label forwarding table entry also includes the label in the VPN routing packet.

After the context label forwarding table entry is constructed by using the construction method provided by the present disclosure, a second VPN route needs to be constructed according to the routing packet of the received first VPN route. In this case, the PE node that receives the first VPN route is required to be able to take the second VPN label allocated by the PE node to the VPN service instance as the service label in the final data packet sent to the current PE node, and encapsulate the virtual circuit label in the outer layer of the service label.

Specifically, that the second routing packet is constructed according to the routing packet of the received VPN route includes that: a second VPN route is constructed according to the received first VPN route. The next hop of the second VPN route is the current PE node, the value of the second VPN label of the second VPN route is the same as the value of the first VPN label, and the second VPN route carries a first predetermined route attribute and a second predetermined route attribute. The first route attribute is used for notifying the PE node that receives the second VPN route of information about the second VPN label is in the context label space which is identified by the virtual circuit label determined by the second predetermined route attribute. The second predetermined route attribute carries information used for determining the virtual circuit label. In the above embodiment, the second predetermined route attribute is the route attribute carrying the identification information of the OPE node.

It should be pointed out that when the virtual circuit label itself is also a label in the context label space, the first predetermined route attribute also carries a label that identifies the context label space to which the virtual circuit label belongs.

In the embodiments of the present disclosure, there are two cases for constructing the second VPN route. In one case, a new route is constructed. In the other case (the SPE node forwards the route packet sent by one TPE node to another TPE node), the first VPN route may be modified to obtain the second VPN route.

As an exemplary embodiment, the second predetermined route attribute carries the information of the OPE node or the value of the virtual circuit label.

Figure 7:
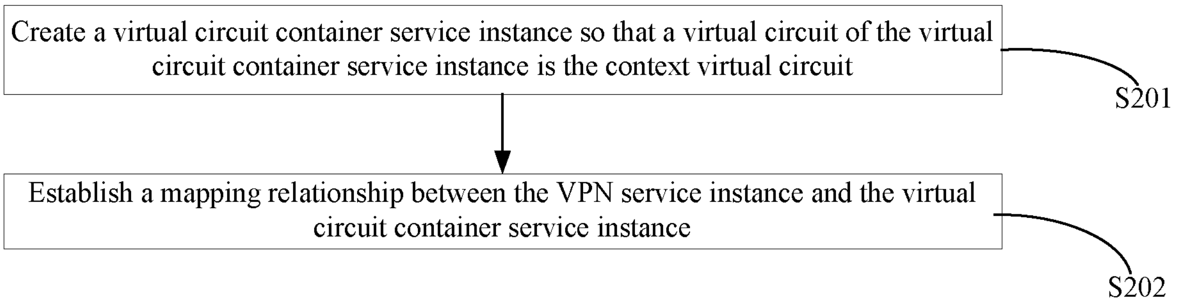
FIG. 7 is a flowchart of obtaining a context virtual circuit through a virtual circuit container service instance when constructing a context label forwarding table entry.

In the embodiments of the present disclosure, there is no special restriction on how to create the context virtual circuit. As an exemplary embodiment, before the context virtual circuit corresponding to the first VPN label of the first VPN route is determined according to the received first VPN route, as shown in FIG. 7, the construction method may also include the following operations.

At S201, a virtual circuit container service instance is created so that a virtual circuit of the virtual circuit container service instance is the context virtual circuit.

At S202, a mapping relationship between the VPN service instance and the virtual circuit container service instance is established.

It is to be noted that in S201, the configuration of the virtual circuit container service instance also needs to be adjusted so that the virtual circuit labels of the context virtual circuits from the current PE node to any other PE node in the VPN service are the same in the VPN service.

The context label forwarding table entry construction method provided by the present disclosure overcomes the problem in the related art that an MP2P LSP egress cannot identify the ingress PE node of the data packet, uses the MP2P tunnel to carry the labels in the context label space, and processes the data packets from different ingress PE nodes differently while using the MP2P LSP, thereby extending the application scenario of the MP29 label. It should be pointed out that the MP2P LSP includes the MP2P tunnel and the MP2P VPN label.

As a third aspect of the embodiments of the present disclosure, a computer-readable storage medium is provided, in which an executable program is stored. When called, the executable program can implement any of the following methods: the data packet processing method provided in the first aspect of the embodiments of the present disclosure; and the context label forwarding table entry construction method provided in the second aspect of the embodiments of the present disclosure.

The working principles and beneficial effects of the data packet processing method and the context label forwarding table entry construction method have been described in details above, which will not be repeated here.

The computer-readable storage medium includes volatile and non-volatile medium, and removable and un-removable medium which is implemented in any method or technology for storing information (such as a computer readable instruction, a data structure, a program module or other data). The computer-readable storage medium includes, but is not limited to, an RAM, an ROM, an EEPROM, a flash memory or other memory technologies, a CD-ROM, a Digital Video Disk (DVD) or other optical storage, a cartridge, a tape, a disk storage or other magnetic storage medium, or any other medium which may be used for storing expected information and may be accessed by a computer.

As a fourth aspect of the embodiments of the present disclosure, a PE is provided, which may include: a storage module, in which an executable program is stored; and one or more processors, which implement any of the following methods when calling the executable program: the data packet processing method provided in the first aspect of the embodiments of the present disclosure; and the context label forwarding table entry construction method provided in the second aspect of the embodiments of the present disclosure.

The working principles and beneficial effects of the data packet processing method and the context label forwarding table entry construction method have been described in details above, which will not be repeated here.

Embodiments are provided below.

Embodiment 1

In embodiment 1, the virtual circuit container service instance uses a Kompella VPLS control plane in a Kompella VPLS, and the VPN service is an EVPN service.

First, by means of the data packet processing method provided in the first aspect of the embodiments of the present disclosure, an EVPN service packet is processed to obtain a final data packet, and then the final data packet is forwarded.

At S101, a virtual circuit infrastructure is constructed for the network. The virtual circuit container service and the Kompella VPLS are the same on the management plane, the control plane and the signaling plane; in addition, by adjusting the configuration of the virtual circuit container service, the virtual circuit labels of the virtual circuits from the same PE node to any other PE node are the same. It should be pointed out that, in the present embodiment, only the control plane is used to establish the PW composed of the virtual circuits. The Kompella VPLS is the VPLS defined in the RFC4761, corresponding to the “virtual circuit container service instance” described above, that is, S111 and S112 above.

It should be pointed out that, in the present embodiment, only the Kompella VPLS control plane is used to establish the PW composed of the virtual circuits. Taking the $PW_{ij}$ between $PE_i$ and $PE_j$ as an example, the PW is composed of the virtual circuit $VC_{ij}$ and the virtual circuit $VC_{ji}$, and the $PW_{ij}$ and the $PW_{ji}$ are the same PW, where i and j indicate the numbers of the PE nodes in the network respectively. It is to be noted that from the perspective of $PE_i$, the $VC_{ij}$ is an ingress virtual circuit of the PW, and the $VC_{ji}$ is an egress virtual circuit of the PW. In the present embodiment, only the control plane rather than the data plane of the Kompella VPLS is used. That is, the virtual circuit container service has no independent data packet, no MAC table, and no ingress replication list, an incoming label of the PW created by the virtual circuit container service is used only as the context label, the context label is a label defined in the RFC5331 that identifies the context label space, the incoming label of the PW serves as the context label, and the context information stored in its ILM table is the identification information of the ingress PE node of the egress virtual circuit of the PW. For ease of description, the PW is called context PW. The context PW here corresponds to the context virtual circuit described above, and the virtual circuit container service here may be called context VPLS.

Figure 8:
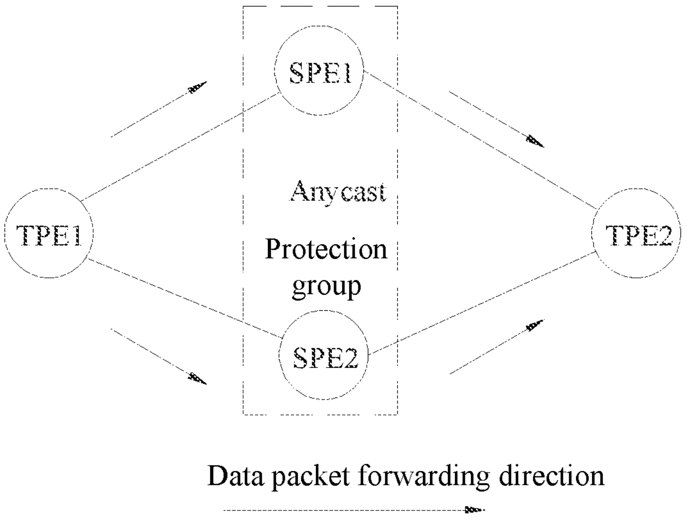
FIG. 8 is a schematic diagram of data forwarding in embodiment 1.
Figure 9:
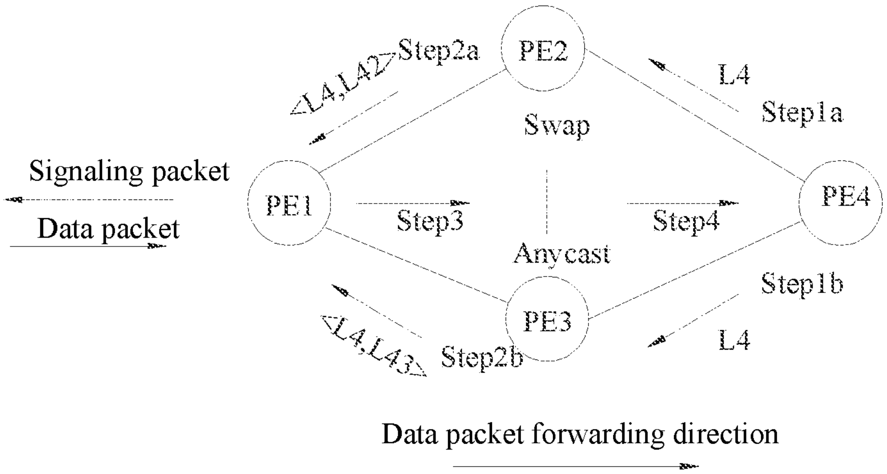
FIG. 9 is a comparison diagram of data packet forwarding and signaling packet forwarding in embodiment 1.

At S102, an EVPN service (corresponding to the above VPN service instance) is created in an MPLS network. The TPE node and the SPE node where the EVPN service resides are a subset of all PE nodes in the MPLS network (as shown in FIG. 8, $PE_1$ node and $PE_4$ node are the TPE nodes, and $PE_2$ node and $PE_3$ node are the SPE nodes, therefore $PE_1$ may be called TPE1, $PE_4$ may be called TPE2, $PE_2$ may be called SPE1, and $PE_3$ may be called SPE2. The TPE nodes of the EVPN service issue the EVPN routes (i.e., the service routes) to each other, including the RT-2 route. Taking unicast data flow forwarding from the TPE1 to the TPE2 as an example, the corresponding control plane EVPN route is the RT-2 route issued from the TPE2 to the TPE1 (the RT-2 route is the type-2 EVPN route, also called MAC/IP advertisement route). An EVI label issued (as shown in Step 1*a* and Step 1*b* in FIG. 9) by the TPE2 in the Label1 field of the RT-2 route is the EVI label of a downstream allocation mode. For ease of description, the RT-2 route is denoted as R1.

At S103, after receiving the EVPN route issued by the TPE node, the SPE node redistributes the EVPN route to other TPEs in an Option B cross-domain mode, and an EVPN signaling interaction is completed between the TPEs through the transfer of the SPE node. Taking the processing when the SPE1 receives the RT-2 route R1 issued by the TPE2 as an example, the SPE1 first performs S210 to determine that the PE (namely the TPE2) identified by the Nexthop of the R1 is taken as the ingress PE and the virtual circuit $VC_{42}$ with the SPE1 as the egress PE is taken as the context virtual circuit of the VPN label of the R1, and then determine its virtual circuit label $L_{42}$. Then, the SPE1 performs S220 and S230 to occupy the label with the same value as the VPN label in the context label space $LS_4$ bound to the label $L_{42}$, and construct the context label forwarding table entry ILM1 for the label. The ILM1 is an ILM table entry in the label space $LS_4$ determined by the label $L_{42}$, the ILM table entry is associated with the NHLFE table entry of the route R1, and the NHLFE table entry includes the VPN label in the R1.

At S103b, the SPE node of the EVPN service modifies the R1 into R2, and transmits the R2 to the node TPE1. The modification is the operation of modifying the received VPN route (the first VPN route) and constructing the second VPN route. The result of the modification is that the value of the VPN label remains unchanged, the value of the Nexthop attribute is the value of the current SPE node, and the value of the OPE TLV is the value of the Nexthop attribute of the R1, and carries the first predetermined route attribute, as shown in Step 2a in FIG. 9. The OPE TLV is an implementation form of the second predetermined route attribute.

It is to be noted that the R1 route does not carry the OPE TLV attribute, but the SPE node should include the OPE TLV in the EVPN route the SPE node issues as long as the SPE node performs S230, so the SPE node adds the OPE TLV to the EVPN route R2.

At S104, after receiving the route R2, the TPE node TPE1 of the EVPN service receives an initial data packet, determines the route R2 according to the destination MAC of the initial data packet, perform S110, S120, S130, and S140 to obtain the final data packet to be forwarded by carrying the VPN label $L_4$ of the route R2 and the label $L_{41}$ of the context virtual circuit $VC_{41}$ determined according to the first predetermined route attribute and the OPE TLV with the initial data packet of the EVPN service.

At S105, the TPE1 forwards the final data packet to the SPE1 or the SPE2 through the service route R2. The final data packet is shared between the SPE1 and the SPE2, as shown in Step 3 in FIG. 9.

At S106, the SPE node SPE1 or SPE2 of the EVPN service receives the final data packet. Taking the node SPE1 as an example, the node SPE1 performs S160 to look up in the label space $LS_4$ determined by the $L_{41}$ the context label forwarding table entry according to the VPN label $L_4$ and remove the $L_{41}$ to obtain a second initial data packet, and then performs S110, S120, S130 and S140 to swap the VPN label $L_4$ of the route R1 at the position where the original position of the $L_4$ in the second initial data packet (such a forwarding behavior is called label swapping) to obtain the final data packet to be forwarded, and forward the final data packet to the TPE2 according to the service route R1; as shown in Step 4 in FIG. 9.

It is to be noted that because there is no the first predetermined route attribute in the VPN route R1 received by the SPE1, there is no the virtual circuit label of the $VC_{42}$ in the final data packet forwarded by the SPE1 to the TPE2; in this way, if the TPE2 does not realize the embodiment of the present disclosure, the TPE2 can also receive the final data packet as the egress PE. However, if the TPE2 does not realize the embodiment of the present disclosure, the TPE2 cannot serve as the ingress PE to send the data packet to the SPE node performing the embodiment of the present disclosure.

It is to be noted that the route R1 generally exists in the form of the NHLFE table entry on the forwarding plane of the SPE, in this case, determining the route R1 according to the label is actually determining the table entry in the form of NHLFE of the route R1. This is a difference in details of the exemplary implementations, which does not affect the essential determination of forwarding according to the route R1. Similarly, the route R2 on the TPE generally exists in the form of FEC-to-NHLFE (FTN) table entry on the forwarding plane.

It is to be noted that the context label forwarding table on the SPE is not a mirror image of the label forwarding table on the TPE for the same customer network destination address, and they have different forwarding behaviors; besides, the SPE node is service agnostic (the SPE node does not have the VPN instance, the protection group IP of the TPE, and a VPN access link to be connected to a Customer Edge (CE) device), the TPE node is service gnostic, and the SPE node is an upstream node of a forwarding path to the TPE node.

S103 may include operations S1031 and S1032.

At S1031, a corresponding relationship between the EVPN service instance and the context VPLS instance where the context PW is located is specified on the PE nodes (including the SPE node) (that is, as described above, a mapping relationship between the VPN service instance and the virtual circuit container service instance is established in S112).

At S1032, when issuing the EVPN route (namely the service route), the PE nodes (including the TPE node and the SPE node) coordinate the consistency of encapsulation/de-encapsulation behaviors on the virtual circuit label on upstream and downstream in the following way: when the service route is constructed, the BGP attribute (namely the first predetermined route attribute described above) is carried, indicating that the PE node issues the EVPN label in the context label space in the RT-2 routing packet, so that the PE node receiving the RT-2 routing packet on upstream encapsulates the corresponding context label in the outer layer of the EVPN label.

It is to be noted that although the usage of the context PW in the EVPN is illustrated mainly taking the EVPN RT-2 route as an example in the previous operations, the present disclosure is not limited to being used in the EVPN RT-2 route, but also in the EVPN RT-1 route for the unicast data packet (namely the EAD route) and the RT-3 route in the ingress replication mode for the BUM data packet (namely the IMET route). The present disclosure is not limited to being used in the EVPN, but also in other VPN technologies such as MPLS $L_3$VPN. Those having ordinary skill in the art may easily apply the context PW to the above scenarios with reference to the description in the embodiments of the present disclosure.

It is to be noted that different from the existing PW, the PW in the embodiments of the present disclosure is not exclusive to a certain $L_2$VPN service instance, the context VPLS instance (namely an implementation form of the virtual circuit container service instance) in the embodiments of the present disclosure only needs to exist on the control plane. There is no need for the context VPLS instance to exist on the forwarding plane, only the context PW is sufficient on the forwarding plane.

It is to be noted that although the exemplary embodiment is illustrated in a Layer 2 EVPN service, the context PW may also be used in VPN technologies such as EVPN IP-VRF.

It is to be noted that the Kompella control plane serving as a virtual circuit container service has no need to modify the next hop during the SPE reflection, and even if the next hop is modified, the information of the OPE node needs to be carried through the second predetermined route attribute; besides, the PE between the virtual circuit container services preferentially determines the identification information of the PE nodes at both ends of the context PW through the second predetermined route attribute.

It is to be noted that the Kompella VPLS service may be the original Kompella VPLS service defined in the standards RFC4761, or a new Kompella VPLS control plane formed by migrating Network Layer Reachability Information (NLRI) defined in the RFC4761 to an EVPN address family. It is to be noted that when the context PW serves the EVPN service, migrating the RFC4761 to the EVPN has an advantage over directly using the RFC4761 to create the context PW, that is, the entire EVPN service may be completed with only one address family.

The method of migrating the RFC4761 to the EVPN in S201 includes the following cases.

In case 2011, the NLRI of the RFC4761 is taken as a type X EVPN route.

In case 2012, the NLRI of the type X EVPN route is not exactly the same as the NLRI of the RFC4761, but both of them include the following ideas in the RFC4761: first, the PE node is identified by VE-id; second, a private network label is issued by label block as an unit; and third, an offset is determined by the VE-id and then the PW label corresponding to the VE-id is read from the label block with the offset.

In case 2013, when only one context VPLS service is created in the entire network, the type X EVPN Route may also not carry a route-target or a fixed route-target, and the VE-id may also be a global node identifier of the PE node in the EVPN network, for example, borrow the node SID of SR-MPLS.

In case 2014, when only one context VPLS service is created in the entire network, the same label block starting from label 16 is specified for the context VPLS service on each PE node in the entire network, and the value of each VE-id is not less than 16, the egress label of the context PW from this node to any other node is the VE-id of this node, in this case, when encapsulating the context PW, the forwarding plane encapsulates a label whose value is the VE-id of this node.

It is to be noted that the method of creating a PW described in the RFC4761 may also be migrated to the SR-MRLS control plane protocol with reference to the above idea. Because the use of the SR-MPLS tunnel becomes more and more common, the signaling interaction of the SR-MPLS tunnel may be multiplexed to establish the context PW or context virtual circuit, thereby simplifying the management of networks.

It is to be noted that the present disclosure only requires that the SPE is a Service Agnostic (SA) node, and the VPN service instances like an IP-VRF instance and an MAC-VRF instance are not required to be configured on the SPE. In this way, under the premise of ensuring the simplicity of configuration on the SPE, the Anycast tunnel protection of the SPE node protection group is realized by ensuring that the same VPN route transferred by different SPE nodes carries the same VPN label and context label.

It should be pointed out that although only one TPE is displayed on the left and right sides of the SPE protection group in the figure, the number of TPEs on both sides of the SPE is unlimited. Taking that there are two TPEs (denoted as TPE2 and TPE3) at the right side of the SPE as an example, the SPE protection group shares the VPN data packet between its members SPE1 and SPE2 to ensure that the TPE1 may pass through the Anycast tunnel, the SPE1 and the SPE2 can only inherit the VPN label issued by the TPE2/TPE3, but cannot allocate the VPN label independently, that is because if two nodes allocate the VPN labels independently, it cannot be ensured that the VPN labels allocated to the same VPN route have the same value. However, the TPE2 and the TPE3 allocate the VPN labels independently, and the VPN labels allocated to different VPN services may happen to be the same. If the SPE inherits both the label allocated by the TPE2 and the label allocated by the TPE3, the data packets sent by the TPE1 to the egress TPE2 and the egress TPE3 have the same VPN label on the SPE node, and the SPE cannot distinguish them. By adding to the data packet the labels of different virtual circuits with the TPE2 and the TPE3 as the ingress nodes, the SPE can distinguish context information about the destination of the two packets and then accurately forward the data packets to the TPE2 and the TPE3, respectively

Embodiment 2

The present embodiment is the same as embodiment 1 unless otherwise specified.

Different from embodiment 1, the virtual circuit container service in the present embodiment does not establish a PW, and there is only one virtual container service in the entire network. For each context PW in embodiment 1, two context virtual circuits are established correspondingly in the present embodiment. The egress PE node and the ingress PE node of the two context virtual circuits are symmetric and within the range of the PE nodes at both ends of the context PW, and the context virtual circuit is established based on SR-MPLS control plane routing protocols (such as ISIS, OSPF, and SR extension of BGP), that is, the virtual circuit container service instance is the routing protocol instance as the SR-MPLS control plane. Taking the context virtual circuit $VC_{ij}$ from $PE_i$ to $PE_j$ as an example, how the context virtual circuit is established is illustrated below: the value of the label $L_{ij}$ of the $VC_{ij}$ is the value of label corresponding to the node SID of $PE_i$ in the SRGB of $PE_j$.

It should be pointed out that by adjusting the configuration to make the SR-MPLS control plane routing protocol instance have the same SRGB on each node, it may be ensured that the virtual circuit label of the virtual circuit from $PE_i$ to any other PE node is the same as the virtual circuit label $L_{ij}$ of the $VC_{ij}$.

It is to be noted that, for ease of description, the SR-MPLS control plane is only used for creating the context virtual circuit, but not for creating the SR-MPLS tunnel, but label mapping, label notification and other signaling interaction processes of the SR-MPLS control plane are the same as that in establishing the SR-MPLS tunnel.

Figure 10:
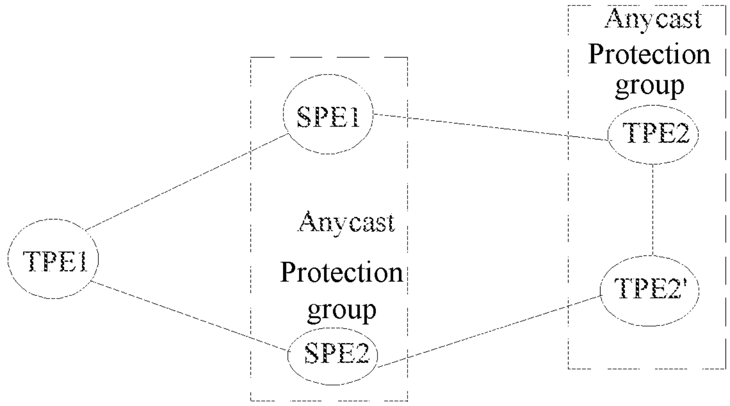
FIG. 10 is a schematic diagram of deployment of a VPN service in embodiment 2.

Different from embodiment 1, as shown in FIG. 10, there is another TPE node TPE2' numbered 5 (i.e. PE5) in the present embodiment. The TPE2' and the TPE2 belong to the same protection group, and the protection group address is IP45. The IP45 is both the IP address of the TPE2 and the IP address of the TPE2'. For the CE device CE2 (not shown) in dual-homing access to the TPE2 and the TPE2', the TPE2 and the TPE2' have the same forwarding capability, that is, as long as there is reachability on the TPE2/TPE2' for a certain network destination address (such as IP/MAC) on the CE, there is also reachability on the TPE2'/TPE2 for the network destination address without going through the TPE2/TPE2'.

Different from embodiment 1, when the TPEs protect each other because of using the Anycast tunnel, the TPEs need to perform S230. Taking the TPE2 as an example, the VPN label $L_4$ is allocated to the VPN instance and the context label forwarding table entry is issued in the label space LS4 which is identified by the virtual circuit label $L_{44}$ of the virtual circuit with the TPE as the ingress PE and the egress PE. The TPE carries the value of the VPN label in the VPN route.

Different from embodiment 1, the TPE performs S240 so that the VPN routing packet constructed and issued by the TPE carries the first and second predetermined route attributes, its next hop needs to be filled in as the protection group address $IP_{45}$, and its second predetermined route attribute needs to be filled in as the node IP address of the TPE ($IP_4$ in the TPE2, and $IP_5$ in the TPE2').

Different from embodiment 1, when the TPE2 or TPE2' receives a VPN route whose next hop is its own IP address, the ILM table entry formed by performing S230 is not associated with the NHLFE table entry, but with the VPN service instance. Generally speaking, the label operation of the ILM table entry is pop.

It is to be noted that, in the present embodiment, the VPN route received by the TPE2 is issued by the TPE2', and the VPN route received by the TPE2' is issued by the TPE2.

It should be pointed out that the TPE2' is symmetric with the TPE2, so the TPE2 is mainly taken as an example to illustrate a forwarding process of the data packet.

Different from embodiment 1, because the VPN route received by the SPE from the TPE2 or the TPE2' carries the first predetermined route attribute, the SPE also encapsulates the context virtual circuit label when forwarding the data packet to the TPE2 and the TPE2'.

Different from embodiment 1, when the TPE2 receives the final data packet from the SPE1, the TPE2 forwards the final data packet according to the labels $L_4$ and $L_{42}$ in the final data packet. Specifically, in the label space LS4 determined by the label $L_{42}$, the corresponding VPN service instance is obtained by looking up the ILM table according to the label $L_4$, and is forwarded in the VPN service instance according to the inner MAC (or IP) of the final data packet.

It is to be noted that the TPE1 may be identical to embodiment 1.

It is to be noted that the VPN labels (the first VPN label) allocated by the TPE2 and the TPE2' to the VPN service instance are generally different, for example, $L_4$ is allocated by the TPE2, and $L_5$ is allocated by the TPE2'; in this way, the specified original data packet may be forwarded by $L_4$ and its matching NHLFE or $L_5$ and its matching NHLFE on the TPE1/SPE1/SPE2. The data packet can be correctly forwarded to the TPE2/TPE2' no matter which forwarding table entry is used.

It is to be noted that although the label space LS2 and the SRGB are located in two independent label spaces, the table entries of the two label spaces may still be combined into the same storage space on the forwarding plane, which is an exemplary implementation detail and does not affect the logical determination that the two essentially belong to different label spaces, that is because according to the MPLS standards, the forwarding behavior corresponding to the MPLS label is determined only by the label value and the label space, and once the label value and the label space are determined, the forwarding behavior is determined regardless of its position in a label stack; combining the ILM table entries with two different forwarding behaviors into the same memory, and then taking different forwarding behaviors according to the position of the label in the label stack is a revision of basic MPLS forwarding principles, but is logically equivalent to the description of regarding the two as belonging to different label spaces.

It is to be noted that, compared with the current method for solving the problem that the EVPN labels on two destination nodes of the Anycast tunnel are inconsistent by statically configuring the same EVPN label on the TPE2 and the TPE2', the scheme based on the context PW in the present embodiment is simpler than the scheme of statically configuring the EVPN label, that is because the virtual circuit container service may be a one-time configuration, and the static EVPN label is a configuration of each EVPN instance level.

It should be pointed out that, in the embodiments of the present disclosure, it is only needed to perform extension on a PE device, not on a Provider (P) device, thereby reducing the range of upgrading network nodes and saving the network construction cost.

It should be pointed out that the present disclosure does not require only two PE nodes in a TPE or SPE protection group. When a PE protection group consists of multiple PE nodes, the present disclosure is applicable no matter the PE nodes in the same protection group are in a load sharing relationship or an active/standby protection relationship.

Embodiment 3

The present embodiment is the same as embodiment 1 unless otherwise specified.

Different from embodiment 1, in the present embodiment, the virtual circuit container service instance is the same as that in embodiment 2, and both are the routing protocol instances serving as the SR-MPLS control plane.

Different from embodiment 2, the SR-MPLS routing protocol instance in the present embodiment is used for creating both the SR-MPLS tunnel and the virtual circuit, and the SRGB used for creating the SR-MPLS tunnel and the SRGB used for creating the virtual circuit have the same label value. In this way, because the same ILM table entry cannot represent both the tunnel forwarding behavior and the virtual circuit forwarding behavior, the ILM table entries of the SR-MPLS tunnel and the virtual circuit with the same label value should reside in different label spaces. For example, taking the $PE_j$ node as an example, the $PE_j$ node identifies the label $L_{ij}$ of the virtual circuit $VC_{ij}$ from $PE_i$ to $PE_j$ and identifies the tunnel label $TL_i$ of the SR-MPLS tunnel to $PE_i$, and the two labels have the same value; however, the ILM table entry of the label $L_{ij}$ is not in the label space where the SRGB of the $TL_i$ is located, but in another label space LS2 on the $PE_j$ node, and for each label value in the SRGB, a label with the same value is reserved in the label space LS2.

Different from embodiment 2, the $PE_{jSC}$ node binds a Static Condition Label (SCL) to the label space LS2, so the $PE_j$ may determine the label space LS2 through the SCL, and look up the ILM table for the label of its inner layer (such as the $L_{ij}$) in the label space LS2, so as to determine the $VC_{ij}$.

Different from embodiment 1, in the present embodiment, the first predetermined route attribute also carries the value of the SCL. In this way, there is no need to ensure that the values of the SCL on the PE nodes in the VPN service are the same, although such consistency is possible.

Different from embodiment 1, in the present embodiment, the node that receives the VPN route carrying the SCL needs to reference the SCL in the NHLFE of the VPN route.

Different from embodiment 1, in the present embodiment, it is needed to encapsulate the SCL in the outer layer of the context virtual circuit label when the data packet is forwarded according to the NHLFE table entry.

It should be pointed out that the SCL may also be replaced by an SPL and an extended SPL. When the label adjacent to the inner layer of the SR-MPLS tunnel can only be a label in the label space LS2, the SCL, the SPL, and the extended SPL may also be omitted, in this case, it is only needed to bind the SR-MPLS tunnel to the label space LS2.

Embodiment 4

In the embodiment 4, the virtual circuit container service instance is the Martini mode L2VPN instance, and the VPN service is the EVPN service.

The context PW in embodiment 1 is the context label used in the RFC5331. The context label identifies a context label space. In the exemplary embodiment 3, the context PW is used for identifying the ingress EVPN PE node of the data packet on the MP2P EVPN label allocated on downstream, thus extending the scope of use of the context label.

That the final data packet corresponding to the VPN service instance is forwarded may include the following operations.

At S301, a virtual circuit container service infrastructure is established. The virtual circuit container service instance is the L2VPN instance using BGP automatic discovery that establishes the PW through the LDP.

It is to be noted that, in the present embodiment, there is no need to ensure the labels of the virtual circuits from the same PE to other PEs to be the same, although such consistency is impossible.

Figure 11:
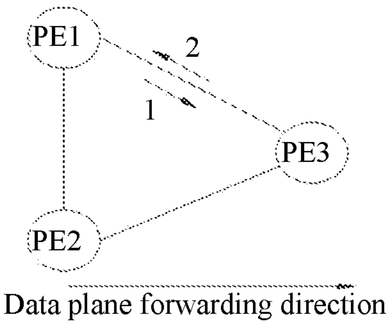
FIG. 11 is a schematic diagram of data forwarding in embodiment 4.

At S302, an MPLS EVPN service is established among the PE1 node, the PE2 node and the PE3 node (as shown in FIG. 11). Unless otherwise specified, the MPLS EVPN service is the same as the EVPN service of the ingress replication mode defined in the RFC7432, and both of them use the downstream allocation mode to allocate the EVPN label. Different from the RFC7432, the MPLS EVPN learns the MAC entry in the remote ES on the data plane rather than synchronizing the MAC entry through the EVPN route. Different from the RFC7432, the MPLS EVPN service data plane also encapsulates the corresponding context PW label within the EVPN label, and the MPLS EVPN service performs S111, S112, S120 and S130 to determine the context PW corresponding to the EVPN route. It is to be noted that, in embodiment 1, because the context PW is the context of the EVPN label in the context label space, the context PW label needs to be encapsulated in the outer layer of the EVPN label, but in the present embodiment, the context PW is taken as the context for MAC learning, so it is better encapsulated in the inner layer of the EVPN label.

At S303, when receiving the EVPN data packet MEDP1 from the PE1 node (as shown in S1 in FIG. 11), the PE3 node may determine by parsing the EVPN label that the inner layer of the EVPN label carries the context PW label, and may determine by parsing the context PW label that the MEDP1 is sent from the PE1 node rather than the PE2 node (the ingress PE node of the EVPN service is denoted as the PE1 node). Then, the $PE_3$ node performs MAC learning on the data plane, and makes the private network source MAC of the MEDP1 (denoted as M1) correspond to the PE1 node, that is, the PE1 node is recorded in the MAC entry for the source MAC address M1 of the MEDP1 as the egress PE node of the MAC entry, the egress EVPN label is the EVPN label sent by the PE1 node in the EVPN route (for example, the RT-3 route), the egress tunnel is the MPLS tunnel (or MP2P tunnel) to the PE1 node, and the corresponding context PW is the context PW to the PE1 node.

At S304, when receiving the data packet EDP1 whose destination MAC is M1 (before S2 in FIG. 11), the $PE_3$ node encapsulates the EDP1 as MEDP2 according to the MAC entry of the M1. The EVPN label is the EVPN label to the PE1 node, the tunnel label is the tunnel label to the PE1 node, and the context PW label is the outgoing label of the context PW to the PE1 node. Then, the PE3 node sends the MEDP2 to the PE1 node (as shown in S2 in FIG. 11).

It is to be noted that by encapsulating the context PW label within the MP2P label allocated on downstream, in the embodiments of the present disclosure, a corresponding relationship between an Overlay source address of the data packet carried by the MP2P label and an Underlay source node is established, in this case, the context PW label actually identifies the context of the inner layer load, rather than the context of the label in a certain layer. The Overlay source address may be IP, MAC, and other forms related to the inner layer load of the MPLS label stack, although only the MAC is taken as an example in the exemplary embodiment.

It is to be noted that when the context PW is used to represent the context of the inner layer load and when the context PW is used to identify the context label space, the positions of the context PW in the label stack of the EVPN data packet are different. As shown in Table 1 (corresponding to the first predetermined format) and Table 2 (corresponding to the second predetermined format which is used in the present embodiment), the former as the context label of the inner layer load is located within the EVPN label, and the latter as the context label of the EVPN label can only be located outside the EVPN label; in this way, the same context PW may simultaneously carry two data packets that use the context PW for different purposes. Although the formats of the two data packets are different, when a context PW only needs to carry the data packet of the context label which only takes the context PW as the inner layer load, the context PW label may also be in the outer layer of the EVPN label.

TABLE 1

| |
|---|
| Underlay Ethernet header |
| PSN tunnel label (MP2P property) |
| Context PW label |
| Label in context label space |
| Inner layer load |

TABLE 2

| |
|---|
| Underlay Ethernet header |
| PSN tunnel label |
| MP2P EVPN label |
| Context PW label |
| Inner layer load |

It is to be noted that the EVPN VPLS avoids the corresponding disadvantages of the Kompella VPLS because the EVPN VPLS abandons the concept of PW and uses the MP2P label instead, but the MPLS EVPN cannot perform MAC learning on the data plane. In the embodiments of the present disclosure, a compromise is adopted, that is, a PW entity is introduced into the MPLS EVPN, but the label of the PW and the EVPN label are superimposed rather than substituted for each other. Because of this, the PW with this property has no need to be exclusive to an EVPN VPLS instance like the Kompella VPLS, but is shared by all or part of the EVPN VPLS instance. The sharing property is an important characteristic of the context PW that distinguishes the context PW from the traditional PW, because the context PW label cannot identify any VPN instance any more.

It is to be noted that another important difference between the context PW and the traditional PW is that there is no need to select an outer tunnel. In fact, the outer tunnel of the data packet is selected in advance on the control plane according to the EVPN route, the context PW label is just inserted between the EVPN label and the outer MP2P tunnel label or encapsulated in the EVPN label with the MP2P property.

It is to be noted that since the context PW label representing the inner layer load context is in the inner layer of the EVPN label, the context PW label is not swapped on the Option B cross-domain SPE node, therefore, in an Option B cross-domain scenario, the OPE TLV attribute may be used as a basis for selecting the context PW to ensure that the context PW label encapsulates the label of the context PW to the TPE node rather than the label of the context PW of the SPE.

It is to be noted that when the context PW is in the outer layer of the EVPN label in the MP2P mode, and there are the Nexthop attribute, the second predetermined route attribute and the OPE TLV attribute in the EVPN route, by default, a context index attribute that is actually in effect (used as the second predetermined route attribute) may be determined by the following priority: the second predetermined route attribute is superior to the OPE TLV attribute, and the OPE TLV attribute is superior to the Nexthop attribute.

It is to be noted that, in addition to the context PW label, there may be an ESL label in the inner layer of the EVPN label of the MP2P property, in this case, the relative position of the context PW label and the ESI label is not technically important; however, when the ESI label is in the context PW label, the EVPN forwarding plane had better not consider the label in the context PW label as the label in the context label space, so both the EVPN label and the ESI label may be the downstream allocation mode. Therefore, it is suggested in the embodiments of the present disclosure that if the context PW label appears in the EVPN label, the context PW label cannot have any other labels in its inner layer except an ELI label and an entropy label.

Embodiment 5

The EVPN defined in the RFC7432 may be used to replace the traditional L2VPN, but on the one hand the EVPN provides many characteristics that the traditional L2VPNs do not have, on the other hand the EVPN does not align with some characteristics of the traditional MPLS L2VPN; especially, the traditional MPLS L2VPN collects performance statistics of a received and sent packet on the tunnel side based on the PW, the PW may identify the peer PE node that the packet is received from or sent to, but the EVPN cannot identify the data packets from different remote PE nodes to the local node. In the exemplary embodiment, by introducing context PW into the EVPN, the accuracy of performance statistics of the packet received on the tunnel side collected by the EVPN is aligned with the traditional MPLS L2VPN.

Unless otherwise specified, the exemplary embodiment is the same as the exemplary embodiment 3.

Different from the exemplary embodiment 4, instead of the scheme of using the data plane to learn the MAC, like the RFC7432, a scheme of using the control plane to interact the MAC entry is used in the preferred embodiment. However, in the present exemplary embodiment, as in the exemplary embodiment 4, the data plane needs to encapsulate the context PW label.

Different from the exemplary embodiment 4, in the present exemplary embodiment, the context PW label is not used for MAC learning on the data plane, but for the performance statistics, alarm information, and log information of the MEDP1 packet. By means of the context PW label, the EVPN data packets received from the PE1 node and the PE2 node through the same EVPN label can be counted separately instead of being mixed up in the present exemplary embodiment. When log and alarm functions need to be implemented on the MEDP1, the information of the PE1 node may also be recorded in the log and alarm information.

It is to be noted that, by encapsulating the context PW label in the MP2P label allocated on downstream, the present disclosure enables the data packet carried by the MP2P label to obtain more accurate performance statistics, log, and alarm.

It is to be noted that when a PE node has no need to perform independent performance statistics on the data packets from different PE nodes, the PE node may inform through signaling the remote PE node whether it is needed to add the context PW label to the data packet sent to it, or the PE node may ignore the received context PW label.

It is to be noted that the method in the present embodiment may also be used to improve the accuracy of alarm and log functions of the EVPN for the received packet on the network side, so that the alarm and log information can reflect the information of the ingress PE node of the data packet.

It is to be noted that when the MPLS $L_2$VPN instance uses a flow label, it is suggested in the embodiments of the present disclosure that the context PW label is in the inner layer of the flow label.

Embodiment 6

Although the EVPN is used as an example in embodiments 1 to 4 of the present disclosure, the core context PW of the embodiment of the present disclosure is not limited to being used in the EVPN, for example, the core context PW may also be used in the MPLS L2VPN service based on the PW. Taking that the context PW is used in a BGP automatic discovery VPLS service defined in the RFC6074 as an example, an illustration is given below.

In the VPLS automatic discovery defined in the RFC6074, after it is discovered among which PE nodes the PWs need to be established, it is also needed to use a PWE3 protocol to establish these PWs, which is not only complex to implement, but also complex to deploy. The dependency on the PWE3 protocol may be removed by introducing the context PW as follows: an additional MP2P or VPLS private network label of an upstream allocation mode may be carried in a BGP signaling phase, so as to replace the original PW label with a composite label <context PW label, MP2P private network label>, thus establishing a PW without PWE3 signaling. The private label in the PW based on the composite label may be in the upstream allocation mode or downstream allocation MP2P mode, unlike the RFC6074 which can only be the downstream allocation mode. So, the application scenario is more flexible, especially in an Anycast tunnel scenario, the upstream allocation mode is more suitable.

Embodiment 7

Figure 12:
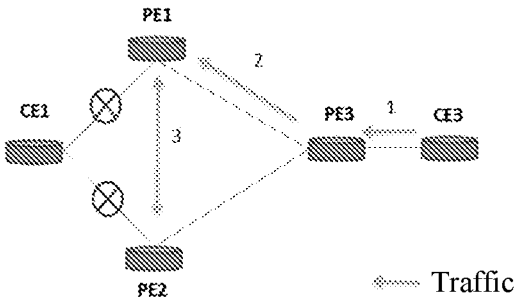
FIG. 12 is a schematic diagram of data forwarding in embodiment 7.

In the EVPN network as shown in FIG. 12, the CE1 node is in dual-homing access to the PE1 node and the PE2 node, and the CE3 node is in single-homing access to the PE3 node. The IBGP-EVPN protocol runs among the PE1 node, the PE2 node, and the PE3 node. Layer 2 access is implemented between the CE1 node and the PE1 node, between the CE1 node and the PE2 node, and between the CE3 node and the PE3 node. It is assumed that both the link between the PE1 node and the CE1 node and the link between the PE2 node and the CE1 node belong to ESI1, the ESI1 on the PE1 node and the PE2 node enables a function of a remote member protecting a local member, the PE1 node is a Designated Forwarder (DF) to the ESI1, and the PE2 node is a non-DF to the ESI1. The PE3 node shares the load of a unicast data flow to the CE1 node between the PE1 node and the PE2 node, and forwards a broadcast data flow to both the PE1 node and the PE2 node. For the ESI1, the PE1 node is the DF, and the PE2 node is the non-DF, so only the PE1 node may forward a broadcast packet sent from the PE3 node to the CE1 node.

If the link between the CE1 node and the PE1 node fails, the traffic forwarded by the PE1 node from the CE3 node to the CE1 node may bypass to the CE1 node through the PE2 node. However, the broadcast traffic will not be forwarded to the CE1 node even if the broadcast traffic bypasses to the PE2 node, that is because the PE2 node cannot distinguish the bypassing traffic from the traffic directly sent by the PE3 node to the PE2 node. At present, the PE2 node can process only two types of traffic uniformly. Until the PE1 node and the PE2 node renegotiate the DF and the PE2 node becomes the DF, the PE2 node forwards the broadcast traffic from the PE3 node to the CE1 node. In this case, the BUM traffic converges after the PE1 node and the PE2 node renegotiate the DF. Although the PE2 node may forward the bypassing unicast traffic to the CE1 node through the link between the CE1 node and the PE2 node, when the link between the CE1 node and the PE2 node also fails, the traffic bypassing from the PE1 node to the PE2 node will return to the PE1 node, thus forming a ping-pong process (as shown in S3 in FIG. 12). This is also because the PE2 node cannot distinguish the bypassing traffic from the traffic directly sent by the PE3 node to the PE2 node, and since the unicast traffic sent by the PE3 node to the PE2 node needs to bypass at this time, both the two types of traffic will bypass.

Figure 13:
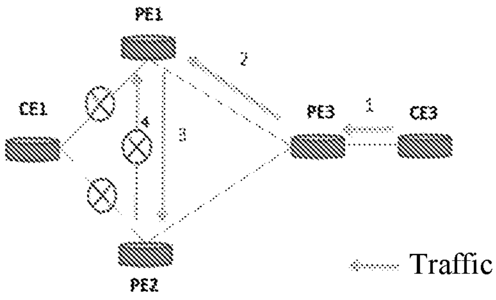
FIG. 13 is a schematic diagram of data forwarding in embodiment 8.

In embodiment 8 of the present disclosure, after the context PW is introduced, when the link between the CE1 node and the PE1 node fails, the BUM traffic sent from the CE3 node to the CE1 node may be forwarded to the PE2 node of a backup route when passing through the PE1 node (which may be called that the BUM traffic bypasses through the PE2 node), and at the same time, the BUM traffic carries the label of the context PW between the PE1 node and the PE2 node (for the broadcast traffic, the broadcast traffic also carries the ESI label corresponding to the ESI between the CE1 node and the PE2 node). The PE2 node identifies the bypassing traffic based on the context PW label, and then can only forward the bypassing broadcast traffic to an Access Circuit (AC) acting as the non-DF for the ESI corresponding to the ESI label instead of going through a bypass process. The traffic directly sent from the PE3 node to the PE2 node can only be forwarded to the AC acting as the DF because the traffic does not carry the context PW label, and after the AC between the CE1 node and the PE2 node fails, the traffic can bypass through the PE1 node. The bypassing unicast traffic is forwarded by looking up the MAC table, but when it is finally decided that the unicast traffic is forwarded to the network side after looking up the MAC table, the unicast traffic cannot be forwarded to a remote node pointed to by the context PW (as shown in S4 in FIG. 13), that is, the unicast traffic cannot be forwarded to the PE2 node in the present embodiment. In this way, the black-hole occurrence time of the BUM packet when the link between the CE node and the PE node fails is minimized.

In this way, by adding the context PW label to the packet, the problem that the broadcast packet to the local ES cannot bypass to the CE node in the ES through a remote adjacent node of the same ES and the problem that there is the ping-pong process although the unicast packet can bypass are solved.

Embodiment 8

The present embodiment is the same as embodiment 4 unless otherwise specified.

Different from embodiment 4, the context PW label in the present embodiment is similar to the virtual circuit label in embodiment 3. The label is allocated and the ILM table entry is constructed in a context label space LS8, so that label resources in each platform label space are not occupied. Because the context PW label is in the EVPN label, as long as the label space LS8 is specified to the FEC in the EVPN instance, the label space LS8 to which the context PW label belongs can be determined through the EVPN label, and then the ILM table is looked up in the label space LS8 for the label in the inner layer of the EVPN label (namely the context PW label in the present embodiment), thereby determining the context PW without the need of the SPL, the extended SPL and the SCL.

It is understandable that the above embodiments are only exemplary embodiments used for illustrating the principles of the present disclosure, but the present disclosure is not limited to this. Those of ordinary skill in the art may make various variations and improvements without departing from the principle and essence of the present disclosure, and these variations and improvements are also regarded as the scope of protection of the present disclosure.

What is claimed is:

1. A virtual circuit-based data packet processing method, which is applied to a Provider Edge (PE) node and comprises:

determining, according to a routing packet corresponding to a Virtual Private Network (VPN) service instance, identification information of a next-hop PE node of the routing packet and identification information of an Original PE (OPE) node of the routing packet, wherein the VPN service instance is deployed on a current PE node and the OPE node;

determining a context virtual circuit, wherein nodes at both ends of the context virtual circuit are respectively the current PE node and the OPE node;

determining a virtual circuit label of the context virtual circuit;

obtaining a first final data packet to be forwarded by carrying a VPN label of the routing packet and the virtual circuit label with an initial data packet of the VPN service instance; and forwarding the first final data packet to be forwarded to the next-hop PE node.

2. The data packet processing method according to claim 1, wherein an ingress node of the context virtual circuit is the OPE node, an egress node of the context virtual circuit is the current PE node, and the first final data packet has a first predetermined format, wherein the first predetermined format is that the virtual circuit label is in an outer layer of the VPN label.

3. The data packet processing method according to claim 2, further comprising:

in response to a received second final data packet having the first predetermined format, determining a context label space according to the virtual circuit label in the received second final data packet;

looking up, in the context label space, an Incoming Label Mapping (ILM) table entry based on a label in an inner layer of the virtual circuit label in the received second final data packet; and forwarding the received second final data packet according to a matched Incoming Label Mapping-Next Hop Label Forwarding Entry (ILM-NHLFE).

4. The data packet processing method according to claim 1, wherein an egress node of the context virtual circuit is the OPE node, an ingress node of the context virtual circuit is the current PE node, and the first final data packet has a second predetermined format, wherein the second predetermined format is that the virtual circuit label is in an inner layer of the VPN label.

5. The data packet processing method according to claim 1, wherein before determining the context virtual circuit, the method further comprises:

creating a virtual circuit container service instance so that a virtual circuit of the virtual circuit container service instance is the context virtual circuit; and establishing a mapping relationship between the VPN service instance and the virtual circuit container service instance.

6. The data packet processing method according to claim 5, wherein the virtual circuit container service instance satisfies a following condition:

a control plane of the virtual circuit container service instance comprises a routing protocol serving as a Segment Routing-Multi-Protocol Label Switching (SR-MPLS) control plane, so that a routing protocol instance of the SR-MPLS control plane is also used as the virtual circuit container service instance; or the virtual circuit container service instance is a Layer 2 Virtual Private Network ($L_2$VPN) control plane that is able to create a Pseudo Wire (PW).

7. The data packet processing method according to claim 6, wherein in a case where the virtual circuit container service instance is used as the routing protocol instance of the SR-MPLS control plane, a value of the virtual circuit label is a value of a label, which corresponds to a Segment Identifier (SID) of the one of the current PE node and the OPE node that is used as the ingress node of the context virtual circuit, in a Segment Routing Global Block (SRGB) of the one of the current PE node and the OPE node that is not used as the ingress node of the context virtual circuit.

8. The data packet processing method according to claim 7, wherein when the routing protocol instance of the SR-MPLS control plane creates an SR-MPLS tunnel through the same SRGB, the method further comprises:

determining an ILM table entry corresponding to the context virtual circuit with the current PE node as the egress node as the table entry in the context label space; and binding the ILM table entry corresponding to SR-MPLS tunnel to the context label space.

9. The data packet processing method according to claim 1, wherein the virtual circuit label is a label in the context label space, and an outer label of the virtual circuit label identifies the context label space, wherein the outer label is one of the following:

an MP2P tunnel label to the next-hop PE node;

a Special Purpose Label (SPL);

an extended SPL;

a static label configured on the next-hop PE node; or the VPN label.

10. The data packet processing method according to claim 4, further comprising:

in response to a second final data packet with the second predetermined format sent by another PE node in a network, determining the identification information of the ingress node of the context virtual circuit corresponding to the received second final data packet according to the virtual circuit label in the received second final data packet, wherein the identification information is used for at least one of the following:

recording the determined identification information of the ingress node as the identification information of an ingress PE node of the received second final data packet;

when the current PE node is about to forward the received second final data packet to the ingress node of the context virtual circuit, discarding the second final data packet; and when the current PE node is about to forward the received second final data packet to any remote PE node in a split horizon group to which the ingress node of the context virtual circuit belongs, discarding the second final data packet.

11. A non-transitory computer-readable storage medium, in which an executable program is stored, when called, the executable program is able to implement the processing method according to claim 1.

12. A Provider Edge (PE), comprising:

a storage module, in which an executable program is stored;

one or more processors, which implement the processing method according to claim 1 when calling the executable program.

13. The data packet processing method according to claim 8, wherein binding the ILM table entry corresponding to the SR-MPLS tunnel to the context label space comprises:

binding the ILM table entry whose SR-MPLS tunnel label operation is pop to the context label space.

14. The data packet processing method according to claim 10, wherein in the operation of recording the determined identification information of the ingress node as the identification information of the ingress PE node of the received second final data packet, the identification information of the determined ingress node is recorded in at least one of: an MAC table entry, alarm information, log information, and performance statistics for an inner layer load.

15. The data packet processing method according to claim 10, wherein the VPN service instance is one of $L_2$VPN service, $L_3$VPN service, or EVPN service.

16. A virtual circuit-based forwarding table entry construction method, which is applied to a Provider Edge (PE) node and comprises:

determining, according to a first VPN route received, a context virtual circuit corresponding to a first Virtual Private Network (VPN) label of the first VPN route, wherein nodes at both ends of the context virtual circuit are respectively a current PE node and an Original PE (OPE) node generating the VPN route, and the first VPN route is a VPN route corresponding to a VPN service instance;

determining a virtual circuit label of the context virtual circuit;

binding a label space to the virtual circuit label so that the context virtual circuit identifies a context label space to which the first VPN label belongs;

determining a value of the first VPN label for the first VPN route in the label space;

constructing a context label forwarding table entry for the first VPN label, wherein the context label forwarding table entry is a label forwarding table entry in the context label space.

17. The construction method according to claim 16, wherein determining the context virtual circuit corresponding to the first VPN label of the first VPN route according to the first VPN route received comprises:

determining the OPE node according to any of the following information: a next hop of the first VPN route, or a first route attribute carried by the first VPN route, wherein the first route attribute is a route attribute carrying information of the OPE node;

taking the determined OPE node as an ingress node of the context virtual circuit, and determining the context virtual circuit.

18. The construction method according to claim 16, wherein after constructing the context label forwarding table entry for the first VPN label, the method further comprises:

constructing a second VPN route according to the received first VPN route, wherein a next hop of the second VPN route is the current PE node, a value of a second VPN label of the second VPN route is the same as the value of the first VPN label, the second VPN route carries a first predetermined route attribute and a second predetermined route attribute, the first route attribute is used for notifying the PE node that receives the second VPN route of information that the second VPN label is in the context label space which is identified by the virtual circuit label determined by the second predetermined route attribute, and the second predetermined route attribute carries information used for determining the virtual circuit label.

19. A non-transitory computer-readable storage medium, in which an executable program is stored, when called, the executable program is able to implement the processing method according to claim 16.

20. A Provider Edge (PE), comprising:

a storage module, in which an executable program is stored;

one or more processors, which implement the processing method according to claim 16 when calling the executable program.

* * * * *